United States Patent
Gerding

(10) Patent No.: US 10,330,517 B2
(45) Date of Patent: Jun. 25, 2019

(54) METHOD FOR OPERATING A CONTACTLESS ULTRASOUND OR RADAR FILL LEVEL MEASURING DEVICE AND CONTACTLESS ULTRASOUND OR RADAR FILL LEVEL MEASURING DEVICE PRACTICING SAID METHOD

(71) Applicant: KROHNE Messtechnik GmbH, Duisburg (DE)

(72) Inventor: Michael Gerding, Bochum (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 255 days.

(21) Appl. No.: 15/405,687

(22) Filed: Jan. 13, 2017

(65) Prior Publication Data
US 2017/0205269 A1 Jul. 20, 2017

(30) Foreign Application Priority Data
Jan. 15, 2016 (DE) .......................... 10 2016 100 674

(51) Int. Cl.
*G01F 23/28* (2006.01)
*G01S 13/88* (2006.01)
(Continued)

(52) U.S. Cl.
CPC ............ *G01F 23/284* (2013.01); *G01F 23/28* (2013.01); *G01F 23/296* (2013.01);
(Continued)

(58) Field of Classification Search
CPC ...... G01F 23/284; G01F 23/28; G01F 23/296; G01F 23/2962; G01S 13/88; G01S 15/02
(Continued)

(56) References Cited

U.S. PATENT DOCUMENTS 4,114,441 A * 9/1978 Magri ................. G01F 23/2962
73/290 V
4,951,056 A * 8/1990 Cope ..................... G01S 13/913
342/29

(Continued)

FOREIGN PATENT DOCUMENTS

DE 2649075 A1 * 12/1977 ......... G01F 23/2962
DE 3812293 A1 * 10/1989 ......... G01F 23/2962
DE 10 2013 103 532 A1 10/2014

*Primary Examiner* — Timothy A Brainard
*Assistant Examiner* — Nuzhat Pervin
(74) *Attorney, Agent, or Firm* — David S. Safran; Roberts Mlotkowski Safran Cole & Calderon, P.C.

(57) ABSTRACT

A method for operating a contactless ultrasound or radar fill level measuring device having at least one open distribution transmitter, at least one receiver and at least one evaluation unit having the following steps: emitting a transmitter signal by the transmitter, receiving a reflection signal reflected on a reflector by the receiver, evaluating the transmitter signal and/or the reflection signal with the evaluation unit which identifies a frequency shift between the transmitter signal and the reflection signal. By evaluating the determined frequency shift or a variable derived from the determined frequency shift, a filling event is detected, in which a filling stream at least partially passes through the transmitter signal. Furthermore, a contactless ultrasound or radar fill level measuring device which performs this method.

9 Claims, 2 Drawing Sheets

(51) Int. Cl.
  *G01S 15/02* (2006.01)
  *G01F 23/284* (2006.01)
  *G01F 23/296* (2006.01)

(52) U.S. Cl.
  CPC .......... *G01F 23/2962* (2013.01); *G01S 13/88* (2013.01); *G01S 15/02* (2013.01)

(58) Field of Classification Search
  USPC ........................................................ 342/124
  See application file for complete search history.

(56) References Cited

U.S. PATENT DOCUMENTS

| | | | | |
|---|---|---|---|---|
| 4,972,386 | A * | 11/1990 | Lau ...................... | G01F 23/2962 342/124 |
| 5,587,969 | A * | 12/1996 | Kroemer ............... | G01F 23/296 367/908 |
| 5,811,688 | A * | 9/1998 | Marsh ...................... | E03F 7/00 73/227 |
| 6,765,491 | B1 * | 7/2004 | Nass .................... | G01S 7/52004 340/686.6 |
| 8,032,255 | B2 * | 10/2011 | Phelan ............... | A01D 41/1275 700/281 |
| 9,086,310 | B2 * | 7/2015 | Hoferer ................... | G01F 23/28 |
| 9,295,279 | B2 * | 3/2016 | Cadeo .................. | A23C 3/0332 |
| 2010/0103021 | A1 * | 4/2010 | Mende ................. | G01S 7/4052 342/28 |
| 2012/0299768 | A1 * | 11/2012 | Griessbaum ............ | G01S 7/292 342/124 |
| 2013/0096851 | A1 * | 4/2013 | Hoferer ................ | G01F 23/284 702/55 |
| 2014/0026651 | A1 * | 1/2014 | Welle ..................... | G01F 23/28 73/290 V |
| 2014/0083184 | A1 * | 3/2014 | Welle ..................... | G01F 23/28 73/290 V |
| 2016/0047684 | A1 * | 2/2016 | Gorenflo ............ | G01F 25/0061 73/290 V |

* cited by examiner

METHOD FOR OPERATING A CONTACTLESS ULTRASOUND OR RADAR FILL LEVEL MEASURING DEVICE AND CONTACTLESS ULTRASOUND OR RADAR FILL LEVEL MEASURING DEVICE PRACTICING SAID METHOD

BACKGROUND OF THE INVENTION

Field of the Invention

The present invention relates to a method for operating a contactless ultrasound or radar fill level measuring device having at least one open distribution transmitter, at least one receiver and at least one evaluation unit comprising the following steps: emitting a transmitter signal by the transmitter, receiving a reflection signal reflected on a reflector by the receiver, evaluating the transmitter signal and/or the reflection signal by the evaluation unit. Furthermore, the invention relates to a contactless ultrasound or radar fill level measuring device comprising at least one open distribution transmitter for emitting a transmitter signal, at least one receiver for receiving a reflection signal reflected on a reflector and at least one evaluation unit designed for evaluating the transmitter signal and/or the reflection signal.

Description of Related Art

Contactless fill level measuring devices for the measurement of the fill level of a fill product arranged in a container as well as methods for operating this device are known from the prior art. A known measuring principle, which forms the basis for the determination of the fill level, is the transit time method. Thereby, during a measurement cycle, an ultrasound or radar signal is emitted from a transmitter in the direction of the fill product and, after being reflected on the surface of the fill product, is received by a receiver as a reflection signal. The transit time of the reflection signal is dependent on the traversed path. In this respect, the distance to the fill product can be determined from the transit time and, from it, the fill level in the container.

A problem that this measuring principle has, is that the transmitter signal is not reflected solely on the fill product surface, but also on so-called static interrupters such as container installations, welding seams or the floor of the container. A reflection signal detected by the receiver is, consequently, a superimposition of individual reflections on different reflectors. The individual reflection signals can be differentiated based on their differing transit times. By recording the reflection signal of an empty container, in particular, it is possible to filter out the portions that are caused by reflections on static interrupters from the reflection signal during fill level measurement.

In addition to static interrupters, however, dynamic interference sources can also influence the measuring process.

Dynamic interferences occur, for example, when the fill product passes through the transmitter signal during the filling event of the container. Namely, it is possible that the transmitter signal at least partially passes through the in-flowing medium, but a reliable measurement of the medium is not given. In order to ensure a reliable fill level measurement, dynamic interferences also have to be taken into account in evaluating the reflection signal.

Currently, dynamic interferences in fill level measurement are taken into account in that the identified measured fill level is subjected to a plausibility check before it is output. For this, for example, a window is determined based on the current fill level, depending on the expected change of the fill level, within which measured fill levels are plausible. If a determined measured fill level is located outside of this window, it is rejected as being implausible.

The German Patent Application DE 10 2013 103 532 A1 and corresponding US Patent Application Publication 2016/047684 disclose a method for measuring the fill level of a fill product in a container, wherein a plausibility check is carried out based on historical and current measurement points and, based on the plausibility check, historical and/or current measurement points deemed implausible are deleted. A further evaluation of the deleted measured values does not take place. In particular, there is no assignment of the measured values deemed implausible to a corresponding interference source.

A disadvantage of this method is that, on the one hand, there is no assignment of the error signal to an interference source, so that elimination and/or consideration of the interference is not possible when outputting the fill level. On the other hand, a filling stream having a small distance to the fill product surface and, in particular, being within the plausibility window is not acknowledged as a measuring error.

Based on this prior art, the object of the present invention is to provide a method for operating a contactless ultrasound or radar fill level measuring device and to provide a contactless ultrasound or radar fill level measuring device, which provides a particularly high reliability of fill level measurement.

SUMMARY OF THE INVENTION

Based on this prior art, a primary object of the present invention is to provide a method for operating a contactless ultrasound or radar fill level measuring device and to provide a contactless ultrasound or radar fill level measuring device, which provides a particularly high reliability of fill level measurement.

According to a first teaching of the invention, the object is achieved with the method mentioned in the introduction in that the evaluation unit identifies a frequency shift between the transmitter signal and the reflection signal and detects a filling event by evaluating the identified frequency shift or a variable derived from the identified frequency shift, in which a filling stream at least partially passes through the transmitter signal.

It was recognized that it is possible to also identify dynamic interference sources, presently the filling event, so that a consideration of this interference source is possible during fill level measurement. According to the invention, the effect of the frequency shift of the reflection signal between a moving reflector and the receiver is exploited. Provided that the filling stream at least partially passes through the transmitter signal, the transmitter signal is at least partially reflected on the filling stream, whereby the filling event is acknowledged and detected.

The detection of the filling event according to the invention based on the frequency shift between the transmitter signal and the reflection signal has the further advantage that even if the filling stream only passes through the transmitter signal partially or is near the fill product surface, the filling event is acknowledged, since the identified frequency shift is independent of the distance of the reflector to the fill product surface. If the detection of a filling event is taken into account during fill level measurement, in particular during the evaluation and/or output of the measured fill level, the indication of erroneous and/or unreliable measured fill level values can be avoided and the reliability of such fill level measurement is increased in this respect.

According to a first implementation of the method according to the invention, the evaluation unit determines the reflector speed from the identified frequency shift and detects the filling event by comparing the reflector speed to a predetermined speed limit. It was recognized thereby that the particles of the filling stream move at a different speed, in particular a greater speed, than particles of the fill product surface. The greater the identified frequency shift is, the greater the speed component of the particle of the filling stream parallel to the direction of propagation of the transmitter signal is. Due to the comparison to a speed limit, it is recognized whether the reflector belongs to a quickly-moving filling stream. Thereby, a filling stream is detected when the reflector speed is greater than the speed limit. Using the assignment of the filling stream based on the speed of the reflector, a clear assignment up to the point in time, at which the reflector strikes the fill product surface, can be ensured. For, its speed is then first reduced to the speed of the fill product surface.

The assignment to the filling event based on the speed of the reflector, namely, in particular, based on the speed components parallel to the direction of propagation of the transmitter signal is, in particular, advantageous in fill level measurement of moving surfaces. Namely, particles of moving surfaces have a greater speed compared to resting fill product. However, the speed components in the direction of propagation of the transmitter signal is still small compared to the speed of particles in the filling stream. In this respect, the above described implementation, in particular in the case of moving surfaces, provides a particularly reliable method for operating a contactless ultrasound or radar fill level measuring device.

The speed limit can be a value predetermined before start-up of the fill level measuring device. Alternatively, the speed limit can, however, also be determined depending on the maximum speed of the fill product surface and, in this respect, dependent on the fill product. Thereby, the speed of the fill product surface is particularly dependent on the size of the particle and the type of the fill product.

According to a further preferred implementation, the evaluation unit identifies the transit time of the reflection signal before, after or during detection of the filling event and determines the fill level from the identified transit time. In an advantageous manner, a method can be provided according to this implementation that allows an essentially simultaneous determination of the fill level and the detection of the filling event. It is of particular advantage when the determination of the fill level and the detection of the filling event take place by evaluating the same reflection signal. The detection of the filling event can then take place during fill level measurement in a particularly simple and fast manner.

It is also preferred when the evaluation unit outputs the detected filling event and the measured fill level, wherein the measured fill level is characterized as unreliable when the evaluation unit detects a filling event. A method according to the implementation provides the user with a particularly high degree of information. On the one hand, it is disclosed that a filling event is detected, whereby it is also disclosed that the fill level measuring device is arranged over the filling stream. This, in particular, is relevant when the container is alternatively or simultaneously filled with different fill product. For, then, the behavior of the fill product during the filling event differs, in particular the spatial distribution of the filling stream above the fill product surface, so that the situation can occur, in which a first fill product passes through the transmitter signal during the filling event, while a second fill product does not pass through the transmitter signal during the filling event. On the other hand, the characterization of the output measured fill level as unreliable has the advantage that outputting of false and/or non-characterized unreliable measured fill levels is avoided. In this respect, the reliability of fill level measurement is further increased by the above-described implementation of the method according to the invention.

According to a further implementation, fill level measurement is interrupted when the evaluation unit detects a filling event. The output of false or at least unreliable measured values can also be avoided in this manner, whereby the reliability of fill level measurement is further increased. Preferably, fill level measurement is automatically started and/or continued when the evaluation unit doesn't detect a filling event.

According to a second teaching of the present invention, the object is achieved by a contactless ultrasound or radar fill level measuring device mentioned in the introduction in that the evaluation, in the operating state, is suitable for identifying a frequency shift between the transmitter signal and the reflection signal and for identifying a filling event by evaluating the identified frequency shift or a variable derived from the identified frequency shift, in which a filling stream at least partially passes through the transmitter signal. With the help of a fill level measuring device according to the invention, a dynamic interference source, namely the filling event, is recognized when the filling stream at least partially passes through the transmitter signal.

The evaluation unit is preferably also suitable for identifying the fill level. If the evaluation takes the detection of a filling event into account, in particular in the evaluation and/or output of the fill level, the reliability of the measurement process is considerably increased.

It is particularly preferred when, in the operating state, the evaluation unit is suitable for determining the reflector speed from the identified frequency shift and for detecting the filling event by comparing the reflector speed to a predetermined speed limit. Preferably, a filling event is detected when the reflector speed is greater than the speed limit. As already described, using the assignment of the filling stream based on the speed of the reflector, a clear assignment up to the point in time, at which the reflector strikes the fill product surface, can be ensured. The speed limit can be a value predetermined before start-up of the fill level measuring device. In a preferred manner, the speed limit is specified in dependence on the maximum speed of the fill product surface and, in this respect, is dependent on the fill product.

It is further advantageous when, in the operating state, the evaluation unit is suitable for identifying the transit time of the reflection signal before, after or during detection of the filling event, and for determining the fill level from the transit time. It is particularly preferred when the determination of the fill level and the detection of the filling event are carried out by evaluating the same reflection signal. Then, a reliable fill level measuring device that recognizes and takes the filling event into account is designed in a particularly simple manner.

It is thereby advantageous when, in the operating state, the evaluation unit is suitable for outputting the detected filling event and the measured fill level, wherein the measured fill level is characterized as unreliable when the evaluation unit detects a filling event.

In an advantageous manner, the arrangement of the fill level measuring device on the container can be made in dependence on the information whether fill product at least partially passes through the transmitter signal during the filling event. Since a fill level measuring device according to the above-described implementation recognizes and takes the filling event into account, it is possible, in particular, to position the fill level measuring device over the filling stream without having to accept erroneous measured fill levels.

Alternatively or additionally to the above-described implementation, it is advantageous when, in the operating state, the evaluation unit is suitable for interrupting fill level measurement. In this manner, the output of false or unreliable measured fill levels is avoided. Preferably, the evaluation unit is designed so that fill level measurement is automatically started and/or continued when the evaluation unit doesn't detect a filling event.

A fill level measuring device according to the above described implementations can, in this respect, advantageously differentiate between measurement of the fill level and a filling event.

In detail, there is a plurality of possibilities for designing the method according to the invention for operating a contactless ultrasound or radar fill level measuring device and the contactless ultrasound or radar fill level measuring device according to the invention. In this respect, reference is made to the following description of preferred embodiments in conjunction with the accompanying drawings.

DETAILED DESCRIPTION OF THE INVENTION

Figure 1:
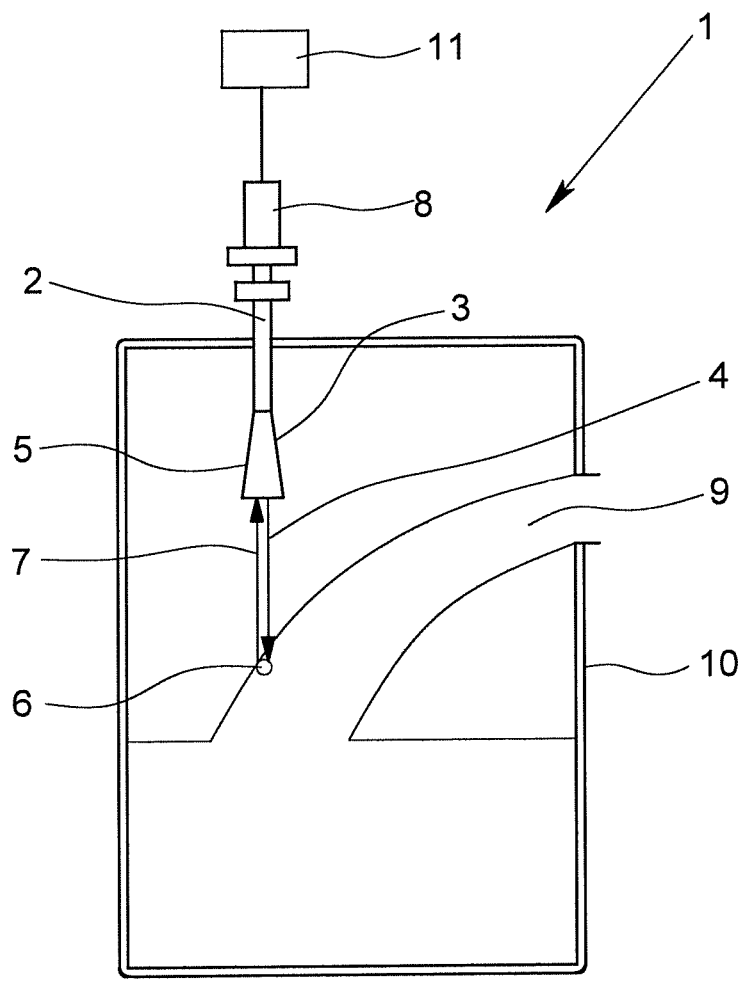
FIG. 1 shows a filling of a container with an embodiment of a fill level measuring device according to the invention arranged on a container, and which is implemented according to a first embodiment of the method according

A filling assembly 1 having a contactless ultrasound or radar fill level measuring device 2 is shown in operation in FIG. 1. The fill level measuring device 2, in each case, has an open distribution transmitter 3 that emits a transmitter signal 4, a receiver 5 that receives a reflection signal 7 reflected on a reflector 6, and an evaluation unit 8 that evaluates the transmitter signal 4 and/or the reflection signal 7. The evaluation unit 8 identifies a frequency shift between the transmitter signal 4 and the reflection signal 7, and by evaluating the identified frequency shift or a variable derived from the identified frequency shift, detects a filling event in which a filling stream 9 at least partially passes through the transmitter signal 4.

In detail, FIG. 1 shows the situation of the filling event of a container 10, wherein fill product in the form of a filling stream 9 is filled into the side of the container 10. The filling stream 9 passes through the transmitter signal 4 emitted by the transmitter 3 of the fill level measuring device 2, whereby the filling event is detected by the evaluation unit 8.

By detecting the filling event with the help of the shown method 1 and the fill level measuring device 2, particularly reliable fill level measurement is provided.

The following explanations relate both to the embodiment of the method for operating a contactless ultrasound or radar fill level measuring device 2 as well as to the fill level measuring device 2 shown.

In the illustrated embodiments, the evaluation unit 8 of the fill level measuring device 2 determines the reflector speed from the identified frequency shift and detects the filling event by comparing the reflector speed to a predetermined speed limit. Presently, the speed limit is a value predetermined before start-up of the fill level measuring device 2. Alternatively, the speed limit can also be specified in dependence on the maximum speed of the fill product surface and, in this respect, dependent on the fill product. By detecting the filling event using the speed of the reflector 6, the filling event itself can be recognized when the reflector 6 has a small distance to the fill product surface. In this respect, the filling event can be recognized in a particularly reliable manner.

Additionally, the evaluation unit 8 presently identifies the transit time of the reflection signal 7 after detecting the filling event and determines the fill level within the container 10 from the identified transit time. Consequently, information about the fill level and/or about the arrangement of the fill level measuring device 2 over the filling stream 9 as well as about the fill level of the container 10 can be obtained from the reflection signal 7 with the method shown and the fill level measuring device 2. In this respect, the method and the fill level measuring device 2 are designed in a particularly simple manner.

Furthermore, the evaluation unit 8 outputs the detected fill level and the measured fill level, wherein the measured fill level is characterized as unreliable when the evaluation unit 8 detects a filling event. Presently, a display unit 11 is provided via which the detected fill level and the measured fill level are output. The display unit 11 visualizes the transmitted values for the user. Alternatively, a corresponding display unit can be integrated in the evaluation unit. Optionally, fill level measurement is interrupted when a filling event is detected. The output of erroneous or non-characterized unreliable measured values is thus prevented.

As a result, a method and a fill level measuring device 2 are shown, which, due to the recognition and consideration of the dynamic interference source of the filling event during fill level measurement, have a particularly high degree of reliability of the output measured fill level.

Figure 2:
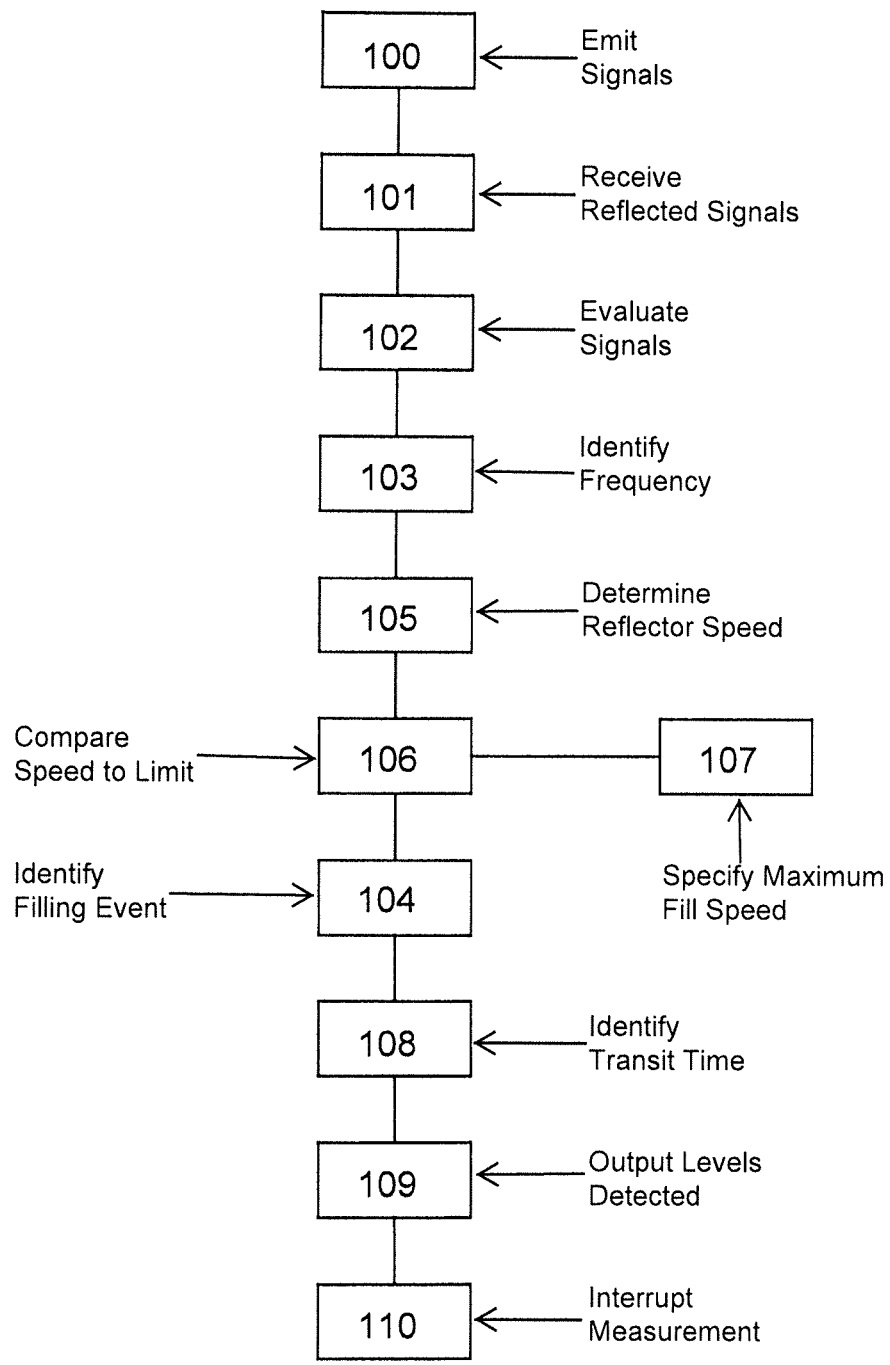
FIG. 2 is a flow chart of a second embodiment of a method according to the invention.

FIG. 2 shows a second embodiment of a method according to the invention for operating a contactless ultrasound or radar fill level measuring device having at least one open distribution transmitter, at least one receiver and at least one evaluation unit, which provides particularly reliable measured fill levels.

In a first step 100, the transmitter emits transmitter signals, which are reflected on a reflector and then received 101 by a receiver. The transmitter and/or reflection signal is evaluated 102 in the next step, wherein a frequency shift between the transmitter signal and the reflection signal is identified 103, from which, in turn, the reflector speed is determined in step 105.

In step 106, by comparing the reflector speed to a speed limit, which is specified depending on the maximum speed of the fill product surface in step 107, the filling event is detected in step 104.

In an advantageous manner, the method uses the speed information of the reflector in order to recognize whether a filling stream passes through the transmitter signal, and in this respect, this is to be taken into account in the further evaluation, or respectively, output of the measured fill level.

After detecting the fill level 104, the transit time of the reflection signal is identified in step 108. Then, the detected fill level and the measured fill level are output in step 109, wherein the measured fill level is characterized as unreliable when the evaluation unit detects a filling event. In the illustrated embodiment, in step 110, fill measurement is interrupted as long as the evaluation unit detects a filling event.

By taking the fill level into account in outputting the measured fill level and, in particular, by interrupting fill level measurement, as long as the evaluation unit detects a filling event, the output of erroneous or non-characterized unreliable measured fill levels is prevented, so that the output measured values according to this method have a particularly high reliability.

What is claimed is:

1. A method for operating a contactless fill level measuring device having at least one open distribution transmitter, at least one receiver and at least one evaluation unit, the method comprising following steps:
    emitting a transmitter signal from the transmitter,
    using the receiver for receiving a reflection signal reflected on a reflector,
    using the evaluation unit for evaluating at least one of the transmitter signal and the reflection signal,
    identifying a frequency shift between the transmitter signal and the reflection signal with the evaluation unit, and
    detecting a filling event, in which a filling stream at least partially passes through the transmitter signal by evaluating the determined frequency shift or a variable derived from the determined frequency shift,
    wherein the evaluation unit determines a reflection speed from the identified frequency shift and detects the filling event by comparing the reflection speed to a predetermined speed limit; and
    outputting occurrence of the filling event detected.

2. The method according to claim 1, wherein the predetermined speed limit is specified depending on a maximum speed of a fill product surface.

3. The method according to claim 1, wherein the evaluation unit identifies a transit time of the reflection signal before, after or during detection of the filling event, and determines a fill level from the identified transit time.

4. The method according to claim 3, wherein the evaluation unit outputs a determined fill level and a measured fill level, and wherein the measured fill level is characterized as unreliable when the evaluation unit detects a filling event.

5. The method according to claim 1, wherein fill level measurement is interrupted when the evaluation unit detects a filling event.

6. A contactless fill level measuring device comprising:
    at least one open distribution transmitter for emitting a transmitter signal,
    at least one receiver for receiving a reflection signal reflected on a reflector, and
    at least one evaluation unit having means for evaluating at least one of the transmitter signal and the reflection signal,
    wherein, in an operating state, the evaluation unit is adapted for identifying a frequency shift between the transmitter signal and the reflection signal and for identifying a filling event by evaluating the identified frequency shift or a variable derived from the identified frequency shift resulting from a filling stream at least partially passing through the transmitter signal,
    wherein, in the operating state, the evaluation unit is adapted for determining a reflection speed from the identified frequency shift and for detecting the filling event by comparing the reflection speed to a predetermined speed limit; and
    wherein the evaluation unit is operative for outputting occurrence of the detected filling event.

7. The fill level measuring device according to claim 6, wherein, in the operating state, the evaluation unit is adapted for identifying a transit time of the reflection signal, before, after or during detection of the filling event, and for determining the fill level from the transit time.

8. The fill level measuring device according to claim 6, wherein, in the operating state, the evaluation unit is adapted for outputting a detected filling event and the measured fill level, and wherein the measured fill level is characterized as unreliable when the evaluation unit detects the filling event.

9. The fill level measuring device according to claim 6, wherein, in the operating state, the evaluation unit is adapted for interrupting the fill level measurement when the evaluation unit (8) detects a filling event.

* * * * *